United States Patent
LeGros et al.

(10) Patent No.: US 11,708,909 B2
(45) Date of Patent: Jul. 25, 2023

(54) CARBON SEAL

(71) Applicant: Hamilton Sundstrand Corporation, Charlotte, NC (US)

(72) Inventors: Craig R. LeGros, Rockford, IL (US); David S. Behling, Belvidere, IL (US); Alexander David White, Essex Jct., VT (US); Erika M. Danckers, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1463 days.

(21) Appl. No.: 15/965,083

(22) Filed: Apr. 27, 2018

(65) Prior Publication Data

US 2019/0331225 A1    Oct. 31, 2019

(51) Int. Cl.
*F16J 15/16* (2006.01)
*F16J 15/34* (2006.01)

(52) U.S. Cl.
CPC ......... *F16J 15/164* (2013.01); *F16J 15/3496* (2013.01)

(58) Field of Classification Search
CPC ........ F16J 15/30; F16J 15/164; F16J 15/3496; F16J 15/3288; F01D 11/00; F01D 11/08; F01D 11/005; F05D 2220/323; F05D 2240/56
See application file for complete search history.

(56) References Cited

U.S. PATENT DOCUMENTS

| | | | | |
|---|---|---|---|---|
| 2,646,296 A * | 7/1953 | Destoumieux | ........... | F16J 15/36 277/371 |
| 2,672,360 A * | 3/1954 | Chambers, Jr. | .......... | F16J 15/36 277/374 |
| 2,984,505 A * | 5/1961 | Andresen | ................. | F16J 15/36 277/388 |
| 3,384,025 A * | 5/1968 | Chabica | ................... | F16J 15/38 415/174.3 |
| 3,416,808 A * | 12/1968 | Voitik | ...................... | F16J 15/38 277/373 |
| 3,578,344 A * | 5/1971 | Yost | ......................... | F16J 15/38 277/373 |
| 3,612,548 A * | 10/1971 | Tracy | ....................... | F16J 15/38 277/385 |
| 3,638,957 A * | 2/1972 | Marsi | ................... | F16J 15/3416 277/400 |
| 3,784,213 A * | 1/1974 | Voitik | .................... | F16J 15/348 277/373 |

(Continued)

FOREIGN PATENT DOCUMENTS

| | | |
|---|---|---|
| CN | 104179975 | 12/2014 |
| EP | 2732100 | 10/2011 |

(Continued)

OTHER PUBLICATIONS

European Search Report for EP Application No. 19171675.2 dated Aug. 27, 2019.

*Primary Examiner* — Eugene G Byrd
*Assistant Examiner* — L. Susmitha Koneru
(74) *Attorney, Agent, or Firm* — Carlson, Gaskey & Olds, P.C.

(57) ABSTRACT

A seal includes a carbon seal that is disposed about an axis and extends between a first axial end and a second axial end. The second axial end includes a seal surface and a radially outer edge of the seal surface is axially spaced from a radially inner edge of the seal surface along the axis.

20 Claims, 3 Drawing Sheets

(56) References Cited

U.S. PATENT DOCUMENTS

| | | | | | |
|---|---|---|---|---|---|
| 3,837,658 | A | * | 9/1974 | Skinner | F16J 15/3472 277/360 |
| 4,269,391 | A | * | 5/1981 | Saito | F16J 15/30 251/315.03 |
| 4,328,973 | A | * | 5/1982 | Delbridge | F16J 15/186 277/304 |
| 4,415,165 | A | * | 11/1983 | Martini | F16J 15/008 277/379 |
| 4,605,235 | A | * | 8/1986 | Sundberg | F16J 15/3464 277/306 |
| 4,854,598 | A | * | 8/1989 | Deuring | F16J 15/38 277/372 |
| 5,013,051 | A | * | 5/1991 | Hilaris | F16J 15/36 277/379 |
| 5,020,809 | A | * | 6/1991 | Mullaney | F16J 15/3488 277/370 |
| 5,947,479 | A | * | 9/1999 | Ostrowski | F16J 15/3452 277/306 |
| 6,109,617 | A | * | 8/2000 | Laney | F16J 15/3484 277/369 |
| 6,135,458 | A | * | 10/2000 | Fuse | F16J 15/342 277/382 |
| 6,425,583 | B1 | * | 7/2002 | Muraki | F16J 15/3412 277/358 |
| 9,784,372 | B2 | | 10/2017 | Iguchi et al. | |
| 2003/0042681 | A1 | * | 3/2003 | Takahashi | F16J 15/36 277/349 |
| 2005/0047912 | A1 | * | 3/2005 | Giesler | F02C 7/277 415/231 |
| 2009/0230628 | A1 | * | 9/2009 | Dobek | F16J 15/3404 277/379 |
| 2017/0114901 | A1 | * | 4/2017 | Yamanaka | F16J 15/32 |
| 2017/0362949 | A1 | * | 12/2017 | Von Berg | F16J 15/30 |
| 2018/0347702 | B1 | * | 12/2018 | Sakano | F16J 15/3232 |
| 2019/0203840 | A1 | * | 7/2019 | Katori | F16J 15/3412 |
| 2019/0293183 | A1 | * | 9/2019 | Miller | F01D 11/00 |

FOREIGN PATENT DOCUMENTS

| | | |
|---|---|---|
| JP | S5518694 | 2/1980 |
| JP | S59164869 | 11/1984 |
| WO | 2014088608 | 6/2014 |

* cited by examiner

CARBON SEAL

BACKGROUND

The present disclosure relates to a seal, and more particularly to a carbon seal.

Carbon seals are frequently used in a number of applications, such as for line replaceable units and in connection with an aircraft gas turbine engines, industrial gas turbines, or other machines. Moreover, carbon seals are used to create seals for both the input and output shafts of a gear box for driving the line replaceable units (LRU). Finally, the seal is used on the LRU itself. Carbon seals are known for their ability to maintain performance under varying thermal and pressure loads.

SUMMARY

In one exemplary embodiment, a seal includes a carbon seal that is disposed about an axis and extends between a first axial end and a second axial end. The second axial end includes a seal surface and a radially outer edge of the seal surface is axially spaced from a radially inner edge of the seal surface along the axis.

In a further embodiment of the above, the radially inner edge is spaced a first distance from the first axial end. The radially outer edge is spaced a second distance from the first axial end. The first distance is greater than the second distance to define the seal surface as convex.

In a further embodiment of any of the above, the first distance at the radially inner edge and the second distance at the radially outer edge are measured at the same circumferential position along the carbon seal.

In a further embodiment of any of the above, the radially inner edge is spaced a first distance from the first axial end. The radially outer edge is spaced a second distance from the first axial end. The first distance is less than the second distance to define the seal surface as concave.

In a further embodiment of any of the above, the first distance at the radially inner edge and the second distance at the radially outer edge are measured at the same circumferential position along the carbon seal.

In another exemplary embodiment, a rotary component includes a first rotating disk disposed about a first axis that includes a first rotating disk seal surface. A first carbon seal is disposed about the first axis and extends between a first axial end and a second axial end. The second axial end includes a seal surface located adjacent the rotating disk seal surface. A radially outer edge of the seal surface is axially spaced from a radially inner edge of the seal surface along the axis.

In a further embodiment of any of the above, the radially inner edge of the seal surface is spaced a first distance from the first axial end. The radially outer edge of the seal surface is spaced a second distance from the first axial end. The first distance is less than the second distance to define the seal surface as concave. The first rotating disk includes a plurality of pumping features.

In a further embodiment of any of the above, the first distance at the radially inner edge and the second distance at the radially outer edge are measured at the same circumferential position along the first carbon seal.

In a further embodiment of any of the above, the rotary component is a line replaceable unit that has a sealed housing.

In a further embodiment of any of the above, the sealed housing includes at least one pressure relief valve.

In a further embodiment of any of the above, the radially inner edge of the seal surface is spaced a first distance from the first axial end. The radially outer edge of the seal surface is spaced a second distance from the first axial end. The first distance is greater than the second distance to define the seal surface as convex. The first rotating disk includes a plurality of pumping features.

In a further embodiment of any of the above, the first distance at the radially inner edge and the second distance at the radially outer edge are measured at the same circumferential position along the carbon seal.

In a further embodiment of any of the above, a second rotating disk is disposed about a second axis that includes a second rotating disk seal surface. A second carbon seal is disposed about the second axis and extends between a first axial end and a second axial end. The second axial end includes a second seal surface located adjacent the second rotating disk seal surface. A radially outer edge of the second seal surface is axially spaced from a radially inner edge of the second seal surface along the second axis.

In a further embodiment of any of the above, the radially inner edge on the second carbon seal is spaced a first distance from the first axial end of the second carbon seal. The radially outer edge of the second carbon seal is spaced a second distance from the first axial end of the second carbon seal. The first distance is greater than the second distance.

In a further embodiment of any of the above, the first distance at the radially inner edge of the second carbon seal and the second distance at the radially outer edge of the second carbon seal are measured at the same circumferential position along the second carbon seal.

In a further embodiment of any of the above, the rotary component is a gear box.

In another exemplary embodiment, a method of controlling the pressure in a rotary component includes the step of rotating a first rotating disk about a first axis relative to a first carbon seal to vary a pressure in the rotary component. The first carbon seal is disposed about the first axis and extends between a first axial end and a second axial end. The second axial end includes a first seal surface located adjacent a first rotating disk seal surface on the first rotating disk. The first carbon seal surface includes a radially inner edge axially spaced from a radially outer edge along the first axis.

In a further embodiment of any of the above, the radially inner edge of the first carbon seal is spaced a first distance from the first axial end of the first carbon seal. The radially outer edge of the first carbon seal is spaced a second distance from the first axial end of the first carbon seal. The first distance is less than the second distance to define the first seal surface as concave. The first rotating disk includes a plurality of pumping features.

In a further embodiment of any of the above, the radially inner edge of the first carbon seal is spaced a first distance from the first axial end of the first carbon seal. The radially outer edge of the first carbon seal is spaced a second distance from the first axial end of the first carbon seal. The first distance is greater than the second distance to define the first seal surface as convex. The first rotating disk includes a plurality of pumping features.

In a further embodiment of any of the above, the method includes rotating a second rotating disk about a second axis relative to a second carbon seal to vary a pressure in the rotary component. The second carbon seal is disposed about the second axis and extends between a first axial end and a second axial end. The second axial end includes a second carbon seal surface located adjacent a second rotating disk seal surface on the second rotating disk. The second carbon seal surface includes a radially inner edge spaced a first distance from the first axial end of the second carbon seal. The radially outer edge is spaced a second distance from the first axial end of the second carbon seal. The first distance is greater than the second distance to define the second seal surface as convex.

DETAILED DESCRIPTION

Figure 1:
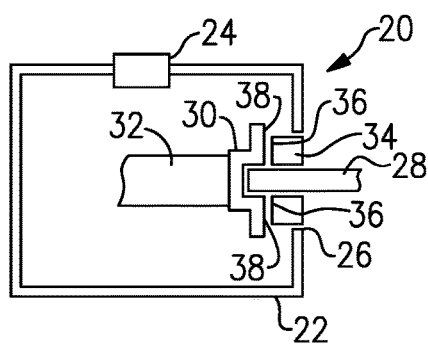
FIG. 1 illustrates an example rotary component.

FIG. 1 schematically illustrates an example rotary component 20, such as a line replaceable unit. The line replaceable unit can be a generator, a starter, a pump, a compressor, and etc. The rotary component 20 includes a housing 22 forming an enclosure. Because the rotary component 20 is a line replaceable unit, the housing 22 is sealed to prevent damage to internal component of the rotary component 20 and includes a pressure relief valve 24 to prevent the housing 22 from becoming overly pressurized.

The housing 22 includes an aperture 26 for accepting an input shaft 28. The input shaft 28 drives a rotating disk 30, which is mechanically attached to an internal shaft 32, such as a disconnect shaft, for driving the internal mechanisms of the rotary component 20 to allow the rotary component 20 to function for its intended purpose.

To maintain a desired pressurized state and to prevent oil loss within the housing 22, a seal assembly 34 is used. The seal assembly 34 includes a seal surface 36 that interfaces with a disk seal surface 38 to form a seal between the rotating disk 30 and the seal assembly 34. This type of seal arrangement is generally known as a hydrodynamic seal or lift off seal. In the illustrated example, the seal assembly 34 is at least partially supported by the housing 22. Although the seal assembly 34 is shown in cross section in the illustrated example, the seal assembly 34 forms an annular ring around the input shaft 28 and fits within the aperture 26.

Figure 2:
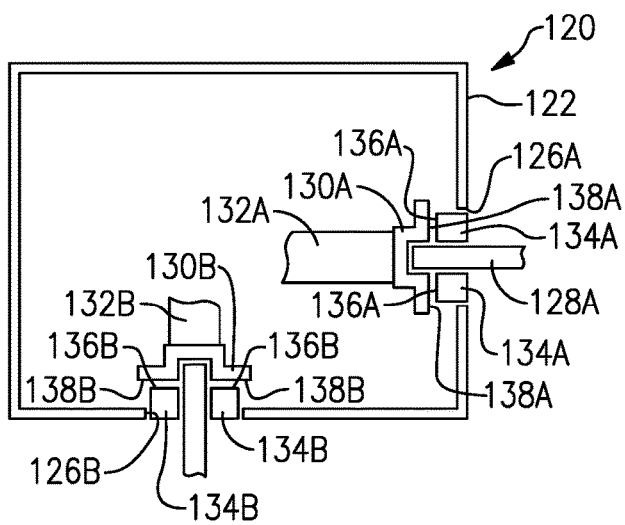
FIG. 2 is another example rotary component.

FIG. 2 illustrates another example rotary component 120, such as a gear box. The rotary component 120 is similar to the rotary component 20 except where described below or shown in the Figures. Moreover, like elements between the rotary component 20 and the rotary component 120 will have the addition of a leading 1 and be followed by an "A" or "B" to indicate multiple like components.

The rotary component 120 includes a housing 122 forming an enclosure. The housing 122 includes a first and second aperture 126A, 126B for accepting a first and second shaft 128A, 128B, respectively. Because the rotary component 120 is a gear box, one of the first and second shafts 128A, 128B could be an input shaft and the other of the first and second shafts 128A, 128B could be a drive shaft, such as a tower shaft. Although only one output shaft is illustrated, the rotary component 120 could have multiple output shafts for driving another rotary component 20. The first and second shafts 128A, 128B each drive a first and second rotating disk 130A, 130B, which are mechanically attached to a first and second internal shaft 132A, 132B, respectively.

To maintain the desired pressurized state within the housing 122, a first and second seal assembly 134A, 134B includes a first and second seal surface 136A, 136B that interfaces with a first and second disk seal surface 138A, 138B to form a seal between the first and second rotating disks 130A, 130B and the first and second seal assemblies 134A, 134B, respectively. In the illustrated example, the first and second seal assemblies 134A, 134B are at least partially supported by the housing 122. Although the first and second seal assemblies 134A, 134B are shown in cross section in the illustrated example, the first and second seal assemblies 134A, 134B form an annular ring around the first and second shafts 128A, and 128B and fit within the first and second apertures 126A, 126B.

Additionally, the housing 122 could have additional apertures and shafts with seal assemblies and rotating disks beyond the two shown in FIG. 2 for driving multiple LRUs under this disclosure.

Figure 3:
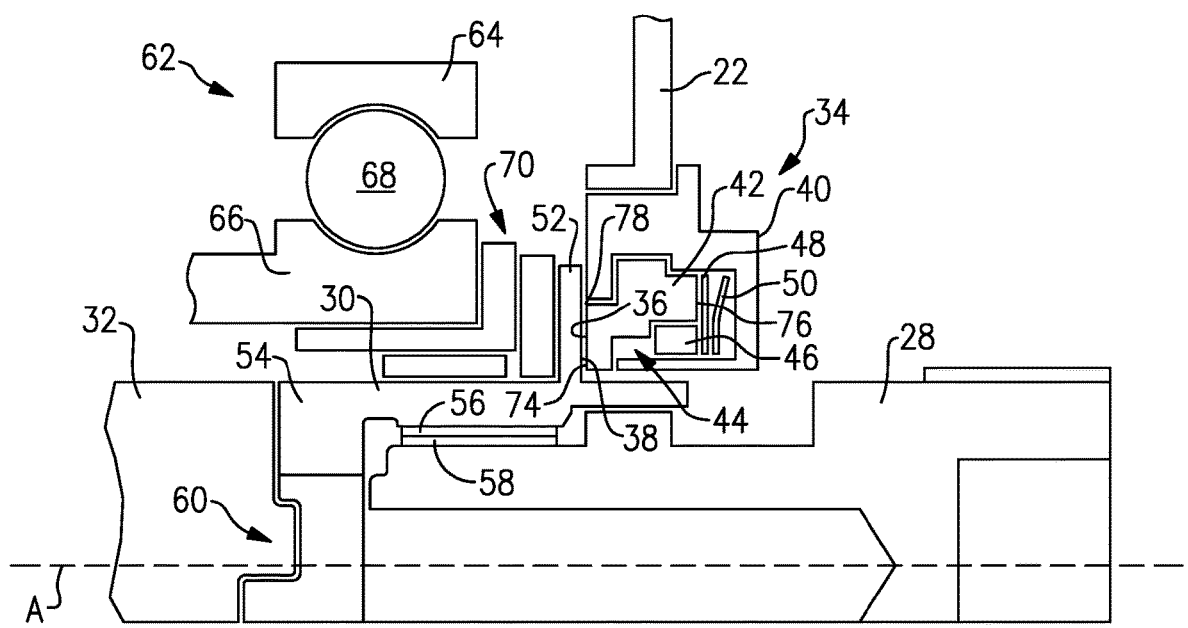
FIG. 3 is an enlarged view of a seal assembly.

FIG. 3 illustrates an enlarged cross-sectional view of the seal assembly 34 about the axis A of rotation of the seal assembly 34. Although FIG. 3 relies on the same reference numerals used in relation to FIG. 1, the description regarding FIG. 3 applies equally to the first and second seal assemblies 134A, 134B and their respective surrounding structure in FIG. 2 except where noted below or shown in the Figures.

The seal assembly 34 includes a carrier 40 for supporting a carbon seal 42. The carbon seal 42 is located in a cavity 44 formed in the carrier 40. An O-ring 46 is located within the cavity 44 between a radially inner side of the carbon seal 42 and the carrier 40 to seal the carbon seal 42 relative to the carrier 40. A spacer 48 separates the carbon seal 42 and the O-ring 46 from a biasing member 50. The biasing member 50 includes a first axial end that engages the carrier 40 and a second axial end that engages the spacer 48 to bias the carbon seal 42 against the rotating disk 30.

The rotating disk 30 includes a radially extending portion 52 having the disk seal surface 38 that interfaces with the seal surface 36 on the carbon seal 42 to form a seal between the rotating disk 30 and the carbon seal 42. The rotating disk 30 also includes an axially extending portion 54 that includes a splined interface 56 on a radially inner side that engages a splined interface 58 in the input shaft 28. The axially extending portion 54 extends fore and aft of the radially extending portion 52. An axial end of the rotating disk 30 includes an interface 60, such as a toothed interface, to connect the rotating disk 30 to corresponding features on the internal shaft 32.

While the seal assembly 34 is principally secured relative to the housing 22, the rotating disk 30 and internal shaft 32 are supported for rotation by a bearing system 62. The bearing system 62 includes an outer race 64 fixed relative to the housing 22 and an inner race 66 that supports the rotating disk 30 and the internal shaft 32. A plurality of rotating bearing members 68 are located between the outer race 64 and the inner race 66. A journal bearing assembly 70 is located between the inner race 66 and the rotating disk 30.

Figure 4:
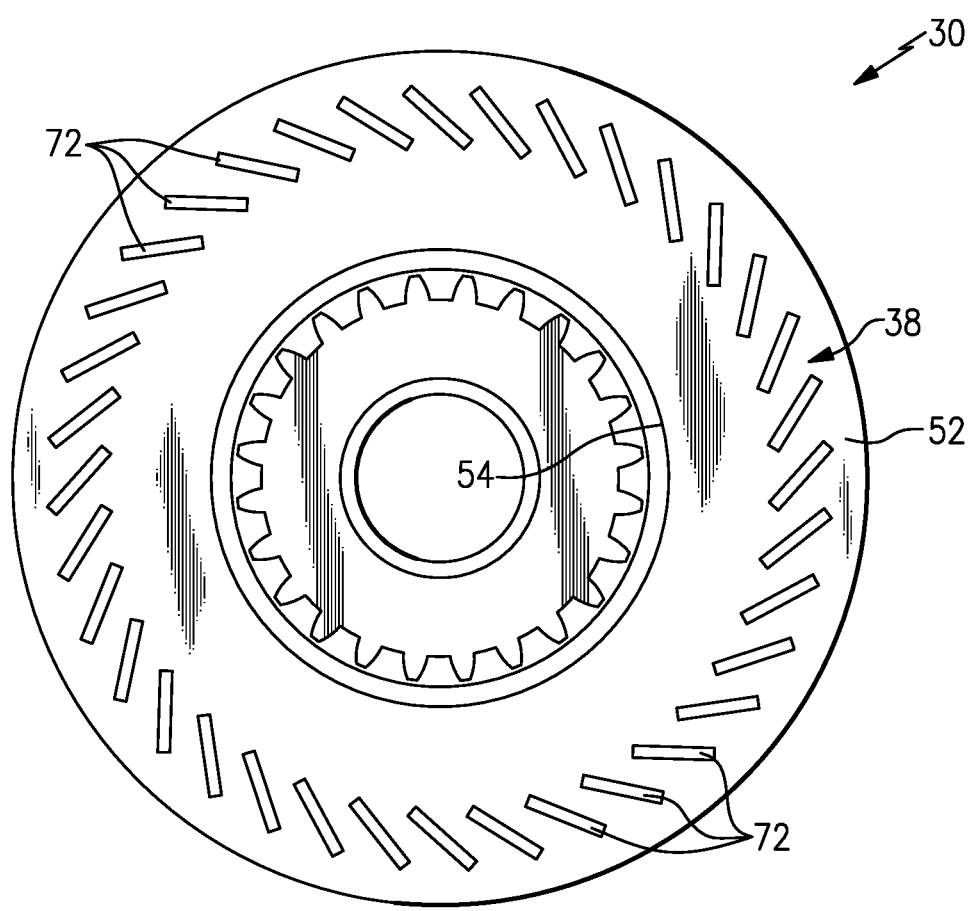
FIG. 4 is an axial view of a disk.

FIG. 4 is an axial view of the rotating disk 30 showing the disk seal surface 38. The disk seal surface 38 includes a plurality of pumping features 72 that interface with the carbon seal 42. During operation of the rotary component 20, the rotating disk 30 rotates and the carbon seal 42 remains stationary. As the rotating disk 30 rotates, the pumping features 72, which are depressions in the disk seal surface 38, interface with the carbon seal 42 to create a hydrodynamic pump that pressurizes the housing 22. Because the rotary component 20 is sealed, the more pumping action the rotating disk 30 and the carbon seal 42 create, the greater the pressure in the housing 22.

Figure 6:
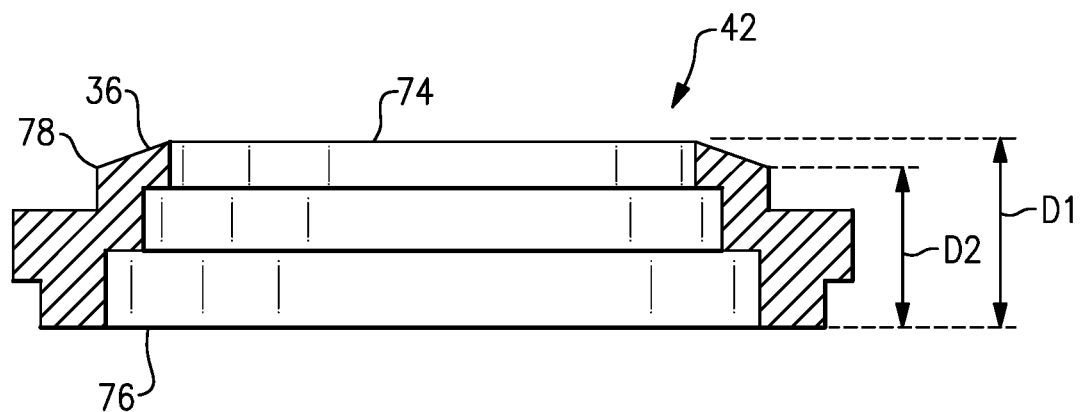
FIG. 6 is a cross-sectional view of another example carbon seal.

To control an amount of pumping that the rotating disk 30 and the carbon seal 42 create and maintain the desired pressurized state within the housing 22, a concavity of the seal surface 36 on the carbon seal 42 is varied. For applications where a greater amount of pumping (reduced oil leakage) and pressure within the housing 22 is desired, such as for gear box applications, the seal surface 36 is convex as shown in FIG. 6. In this configuration, the seal surface 36 includes a radially inner edge 74 and a radially outer edge 78 with the radially inner edge 74 spaced a first distance D1 from a first axial end 76 of the carbon seal 42 and the radially outer edge 78 is spaced a second distance D2 from the first axial end 76. In this example, the first distance D1 being greater than the second distance D2 and the first distance D1 and the second distance D2 are both measured at the same circumferential position along the carbon seal 42. In the illustrated example, the seal surface 36 forms a second axial end of the carbon seal 42.

Figure 5:
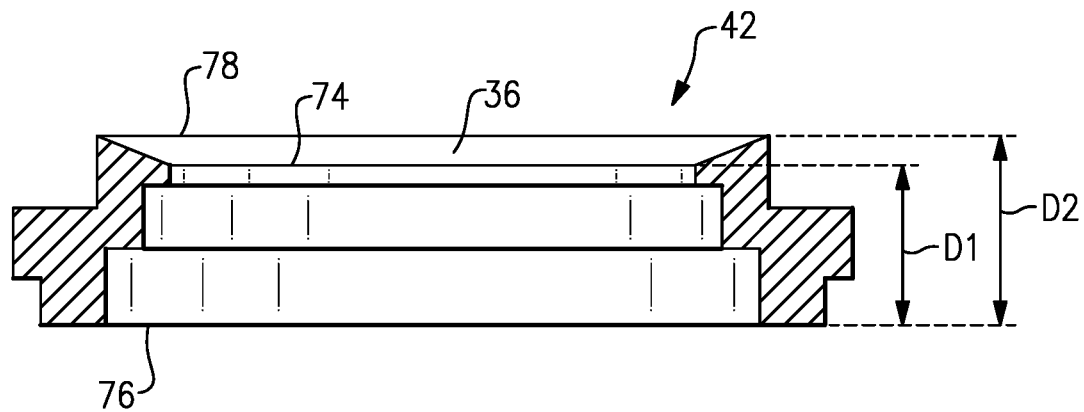
FIG. 5 is a cross-sectional view of an example carbon seal.

Conversely, for applications were a reduced amount of pumping is desired, such as for line replaceable units, the seal surface 36 is concave as shown in FIG. 5. In this configuration, the radially inner edge 74 is spaced the first distance D1 from the first axial end 76 of the carbon seal 42 and the radially outer edge 78 is spaced the second distance D2 from the first axial end 76. In this example, the first distance D1 is less than the second distance D2 and the first distance D1 and the second distance D2 are both measured at the same circumferential position along the carbon seal 42.

In the example of FIG. 5 where the seal surface 36 is concave and in the example of FIG. 6 where the seal surface 36 is convex, the seal surface 36 maintains an overall flatness measurement of three or less helium light bands. In another example, the seal surface 36 of FIGS. 5 and 6 maintain an overall flatness measurement of two or less helium light bands.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal comprising:
   a carbon seal disposed about an axis and extending between a first axial end and a second axial end, wherein the second axial end includes a seal surface and a radially outer edge of the seal surface is axially spaced from a radially inner edge of the seal surface along the axis;
   a rotating disk disposed about the axis including a rotating disk seal surface; the rotating disk that is rotatable about the axis relative to the carbon seal; and the rotating disk seal surface faces an opposite axial direction from the seal surface on the carbon seal and the rotating disk seal surface interfaces with the seal surface on the carbon seal.

2. The seal of claim 1, wherein the radially inner edge is spaced a first distance from the first axial end and the radially outer edge is spaced a second distance from the first axial end and the first distance is greater than the second distance to define the seal surface as convex.

3. The seal of claim 2, wherein the first distance at the radially inner edge and the second distance at the radially outer edge are measured at the same circumferential position along the carbon seal.

4. The seal of claim 1, wherein the radially inner edge is spaced a first distance from the first axial end and the radially outer edge is spaced a second distance from the first axial end and the first distance is less than the second distance to define the seal surface as concave.

5. The seal of claim 4, wherein the first distance at the radially inner edge and the second distance at the radially outer edge are measured at the same circumferential position along the carbon seal.

6. A rotary component comprising:
   a first rotating disk disposed about a first axis including a first rotating disk seal surface;
   a first carbon seal disposed about the first axis and extending between a first axial end and a second axial end, wherein the second axial end includes a first seal surface located adjacent the first rotating disk seal surface and a radially outer edge of the seal surface is axially spaced from a radially inner edge of the seal surface along the axis; the first rotating disk that is rotatable about the axis relative to the first carbon seal; and the first rotating disk seal surface faces an opposite axial direction from the first seal surface on the first carbon seal and the first rotating disk seal surface interfaces with the seal surface on the first carbon seal.

7. The rotary component of claim 6, wherein the radially inner edge of the seal surface is spaced a first distance from the first axial end and the radially outer edge of the seal surface is spaced a second distance from the first axial end and the first distance is less than the second distance to define the seal surface as concave and the first rotating disk includes a plurality of pumping features.

8. The rotary component of claim 7, wherein the first distance at the radially inner edge and the second distance at the radially outer edge are measured at the same circumferential position along the first carbon seal.

9. The rotary component of claim 8, wherein the rotary component is a line replaceable unit having a sealed housing and the sealed housing includes at least one pressure relief valve.

10. The rotary component of claim 6, wherein the radially inner edge of the seal surface is spaced a first distance from the first axial end and the radially outer edge of the seal surface is spaced a second distance from the first axial end and the first distance is greater than the second distance to define the seal surface as convex and the first rotating disk includes a plurality of pumping features.

11. The rotary component of claim 10, wherein the first distance at the radially inner edge and the second distance at the radially outer edge are measured at the same circumferential position along the carbon seal.

12. The rotary component of claim 11, further comprising:
   a second rotating disk disposed about a second axis including a second rotating disk seal surface; and
   a second carbon seal disposed about the second axis and extending between a first axial end and a second axial end, wherein the second axial end includes a second seal surface located adjacent the second rotating disk seal surface and a radially outer edge of the second seal surface is axially spaced from a radially inner edge of the second seal surface along the second axis.

13. The rotary component of claim 12, wherein the radially inner edge on the second carbon seal is spaced a first distance from the first axial end of the second carbon seal and the radially outer edge of the second carbon seal is spaced a second distance from the first axial end of the second carbon seal and the first distance is greater than the second distance.

14. The rotary component of claim 13, wherein the first distance at the radially inner edge of the second carbon seal and the second distance at the radially outer edge of the second carbon seal are measured at the same circumferential position along the second carbon seal.

15. The rotary component of claim 14, wherein the rotary component is a gear box.

16. A method of controlling the pressure in a rotary component, the method comprising the steps of:
rotating a first rotating disk about a first axis relative to a first carbon seal to vary a pressure in the rotary component, wherein the first carbon seal is disposed about the first axis and extends between a first axial end and a second axial end and the second axial end includes a first seal surface located adjacent a first rotating disk seal surface on the first rotating disk and the first carbon seal surface includes a radially inner edge axially spaced from a radially outer edge along the first axis;
and the first rotating disk seal surface faces an opposite axial direction from the seal surface on the first carbon seal and the first rotating disk seal surface interfaces with the first seal surface on the first carbon seal.

17. The method of claim 16, wherein the radially inner edge of the first carbon seal is spaced a first distance from the first axial end of the first carbon seal and the radially outer edge of the first carbon seal is spaced a second distance from the first axial end of the first carbon seal and the first distance is less than the second distance to define the first seal surface as concave and the first rotating disk includes a plurality of pumping features and the first rotating disk seal surface faces an opposite axial direction from the first seal surface on the first carbon seal.

18. The method of claim 16, wherein the radially inner edge of the first carbon seal is spaced a first distance from the first axial end of the first carbon seal and the radially outer edge of the first carbon seal is spaced a second distance from the first axial end of the first carbon seal and the first distance is greater than the second distance to define the first seal surface as convex and the first rotating disk includes a plurality of pumping features and the first rotating disk seal surface faces an opposite axial direction from the first seal surface on the first carbon seal.

19. The method of claim 16, further comprising:
rotating a second rotating disk about a second axis relative to a second carbon seal to vary a pressure in the rotary component, wherein the second carbon seal is disposed about the second axis and extends between a first axial end and a second axial end and the second axial end includes a second carbon seal surface located adjacent a second rotating disk seal surface on the second rotating disk and the second carbon seal surface includes a radially inner edge spaced a first distance from the first axial end of the second carbon seal and the radially outer edge spaced a second distance from the first axial end of the second carbon seal and the first distance is greater than the second distance to define the second seal surface as convex.

20. The rotary component of claim 6, wherein the first rotating disk seal surface faces an opposite axial direction from the seal surface on the first carbon seal.

* * * * *